United States Patent
Sridharan et al.

(10) Patent No.: US 10,375,053 B2
(45) Date of Patent: Aug. 6, 2019

(54) CROSS-PLATFORM SINGLE SIGN-ON ACCESSIBILITY OF A PRODUCTIVITY APPLICATION WITHIN A SOFTWARE AS A SERVICE PLATFORM

(71) Applicant: Microsoft Technology Licensing, LLC., Redmond, WA (US)

(72) Inventors: Ganesh Sridharan, Redmond, WA (US); Vadim Eydelman, Bellevue, WA (US); Anand Krishnamurthy, Bellevue, WA (US); Srividhya Chandrasekaran, Kirkland, WA (US); Daniel C. Stevenson, Bellevue, WA (US); Sameer D. Bedekar, Issaquah, WA (US); Aravind Namasivayam, Bellevue, WA (US); Xiaozhong Luo, Redmond, WA (US); Andrew Guy Bybee, Woodinville, WA (US); Ekaterina Bassova, Sammamish, WA (US); Marc Kuperstein, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 337 days.

(21) Appl. No.: 15/267,012

(22) Filed: Sep. 15, 2016

(65) Prior Publication Data
US 2018/0077143 A1    Mar. 15, 2018

Related U.S. Application Data

(60) Provisional application No. 62/385,832, filed on Sep. 9, 2016.

(51) Int. Cl.
*G06Q 10/10*    (2012.01)
*H04L 29/06*    (2006.01)

(52) U.S. Cl.
CPC ......... *H04L 63/0815* (2013.01); *G06Q 10/10* (2013.01); *H04L 63/0807* (2013.01); *H04L 63/0884* (2013.01)

(58) Field of Classification Search
CPC ............. H04L 63/0815; H04L 63/0807; H04L 63/0884; G06Q 10/10
See application file for complete search history.

(56) References Cited

U.S. PATENT DOCUMENTS 8,453,224 B2    5/2013  Mutt
8,615,794 B1 *  12/2013 Tomilson ............ G06F 21/6218
                                                  713/182

(Continued)

OTHER PUBLICATIONS

Alotaibi et al., Enhancing OAuth Services Security by an Authentication Service with Face Recognition, 2015, IEEE (Year: 2015).*

(Continued)

*Primary Examiner* — Saleh Najjar
*Assistant Examiner* — Louis C Teng
(74) *Attorney, Agent, or Firm* — Merchant & Gould P.C.

(57) ABSTRACT

A Cross-Platform Single Sign On (CP-SSO) experience is provided herein to enable users to access multiple services via a single login when working across different platforms. A user may work across different platform when using multiple devices, when using multiple browsers on a single device, or when an integrated application requires a separate login for access within a host web application or portal service. A proxy token service manages login requests and authentication tokens after a given service has been logged into once by a user, so that the user does not need to provide login credentials on subsequent requests for the given service. By enabling a CP-SSO experience, network efficiency is improved, and the user experience is also improved as users do not need to supply authentication credentials as (Continued)

frequently and may freely choose to use multiple platforms instead of limiting usage to a single platform.

19 Claims, 8 Drawing Sheets

(56) References Cited

U.S. PATENT DOCUMENTS

| | | | |
|---|---|---|---|
| 8,621,589 | B2 | 12/2013 | Chen et al. |
| 8,935,757 | B2* | 1/2015 | Srinivasan ............... H04L 63/10 726/4 |
| 8,990,699 | B2 | 3/2015 | Pugh et al. |
| 8,990,911 | B2 | 3/2015 | Olden et al. |
| 9,282,097 | B2 | 3/2016 | Agarwal et al. |
| 9,985,953 | B2* | 5/2018 | Koushik ............... H04L 63/0807 |
| 10,025,758 | B2* | 7/2018 | Brown ............... G06F 17/30896 |
| 2013/0086669 | A1 | 4/2013 | Sondhi et al. |
| 2013/0139241 | A1* | 5/2013 | Leeder ............... H04W 12/06 726/9 |
| 2014/0282971 | A1 | 9/2014 | Gustavson et al. |
| 2015/0089579 | A1 | 3/2015 | Manza et al. |
| 2016/0134616 | A1* | 5/2016 | Koushik ............... H04L 63/0807 726/9 |
| 2016/0313882 | A1* | 10/2016 | Brown ............... G06F 17/30896 |
| 2017/0142108 | A1* | 5/2017 | Zhang ............... H04L 63/0884 |
| 2018/0278602 | A1* | 9/2018 | Koushik ............... H04L 63/0807 |
| 2018/0288047 | A1* | 10/2018 | Zhang ............... H04L 63/0884 |

OTHER PUBLICATIONS

Sendor et al., Platform-level support for Authorization in Cloud Services with OAuth 2, 2014, IEEE (Year: 2014).*

Reimer et al., Federated Identity Access Broker Pattern for Cloud Computing, 2013, IEEE (Year: 2013).*

Smalser, et al., "What is application access and single sign-on with Azure Active Directory?", Retrieved on: Sep. 7, 2016 Available at: https://azure.microsoft.com/en-in/documentation/articles/active-directory-appssoaccess-whatis/.

Yanchyshyn, Matt, "Identity Federation and SSO for SaaS on AWS", Published on: Jul. 14, 2015 Available at: https://aws.amazon.com/blogs/apn/identity-federation-and-sso-for-saas-on-aws/.

"SaaS SSO Applications—Cloud Single Sign on Security Platform", Retrieved on: Sep. 7, 2016 Available at: http://www.cloudaccess.com/products/saas-sso/.

Mittal, Kunal, "Extend single sign-on to the cloud", Published on: Oct. 19, 2012 Available at: http://www.ibm.com/developerworks/cloud/library/cl-singlesignoncloud/.

Love, et al., "Integrate Azure Active Directory single sign-on with SaaS apps", Retrieved on: Sep. 7, 2016 Available at: https://azure.microsoft.com/en-in/documentation/articles/active-directory-sso-integrate-saas-apps/.

George, Randy, "Single Sign-On for the Cloud", Published on: Oct. 3, 2012 Available at: http://www.informationweek.com/cloud/software-as-a-service/single-sign-on-for-the-cloud/d/d-id/1106648?.

* cited by examiner

CROSS-PLATFORM SINGLE SIGN-ON ACCESSIBILITY OF A PRODUCTIVITY APPLICATION WITHIN A SOFTWARE AS A SERVICE PLATFORM

CROSS-REFERENCE TO RELATED APPLICATIONS

This application claims benefit of U.S. Provisional Patent Application No. 62/385,832 titled "CROSS-PLATFORM SINGLE SIGN-ON ACCESSIBILITY OF A PRODUCTIVITY APPLICATION WITHIN A SOFTWARE AS A SERVICE PLATFORM" filed on Sep. 9, 2016, the entirety of which is hereby incorporated by reference.

BACKGROUND

When users access services on computer devices, they provide credentials to establish their identities with the service provider and thereby access the services. For example, a user may gain access to a social media account, an email server, an online productivity application, an online forum, an online bank account, an instant messenger service, etc., by providing a username and a shared secret, such as a password, biometric marker, a key, or a derived token. Some online services allow for a Single Sign On (SSO) experience, where a user provides a username and shared secret to for one service and may access a second service without resubmitting a username and shared secret. These SSO experiences are achieved either through an identity federation between services providers (agreeing to trust one another's authentications) or by maintaining a session-based authentication cookie for the user and an Identity Provider (Idp). In some aspects, a service provider is also an IdP, which may require its own authentication and authorization service to be used, which precludes the use of an SSO experience via an identity federation in some situations where the parties may not trust one another to provide secure logins. Similarly, authentication cookies are not platform agnostic, which precludes their use for providing an SSO experience in situations in which multiple platforms (or devices) are used.

SUMMARY

This summary is provided to introduce a selection of concepts in a simplified form that are further described below in the Detailed Description section. This summary is not intended to identify all key or essential features of the claimed subject matter, nor is it intended as an aid in determining the scope of the claimed subject matter.

Systems, methods, and computer readable media are provided herein to enable a Single Sign On (SSO) experience when working across different platforms. A user may work across different platform when using multiple devices, when using multiple browsers on a single device, or when an integrated application requires a separate Sign On to be accessed within a host web application or portal service.

When a user first makes use of the present disclosure for a given cloud productivity application, user credentials to access the given cloud productivity application are provided to a token service. The token service will handle the user's authorization with the cloud productivity application's service provider and will store the user's identity token and the access token as well as a multi-resource refresh token received from the service's identity provider in association with other login credentials and access for the user.

When a user subsequently makes use of the present disclosure and has been authorized to access a first service, the stored access tokens and multi-resource refresh tokens are used to automatically sign the user into other services as they are requested. For example, after a user has logged into a first social media website, productivity application, or other account, the user will be provided with the access tokens to access a second social media website, productivity application or other account without having to manually input user credentials again.

The present disclosure improves the efficiency of the computing devices employing it by reducing the amount of user input required to maintain connectivity to multiple cloud productivity application and provide an SSO therefor. The user experience is also improved, as users do not need to supply authentication credentials as frequently and may freely choose to use multiple platforms instead of limiting their use to a single platform.

Examples are implemented as a computer process, a computing system, or as an article of manufacture such as a device, computer program product, or computer readable medium. According to an aspect, the computer program product is a computer storage medium readable by a computer system and encoding a computer program comprising instructions for executing a computer process.

The details of one or more aspects are set forth in the accompanying drawings and description below. Other features and advantages will be apparent from a reading of the following detailed description and a review of the associated drawings. It is to be understood that the following detailed description is explanatory only and is not restrictive of the claims.

BRIEF DESCRIPTION OF THE DRAWINGS

The accompanying drawings, which are incorporated in and constitute a part of this disclosure, illustrate various aspects. In the drawings:

FIG. 1 is a block diagram of an example environment for providing cross-platform single sign-on;

DETAILED DESCRIPTION

Figure 1:
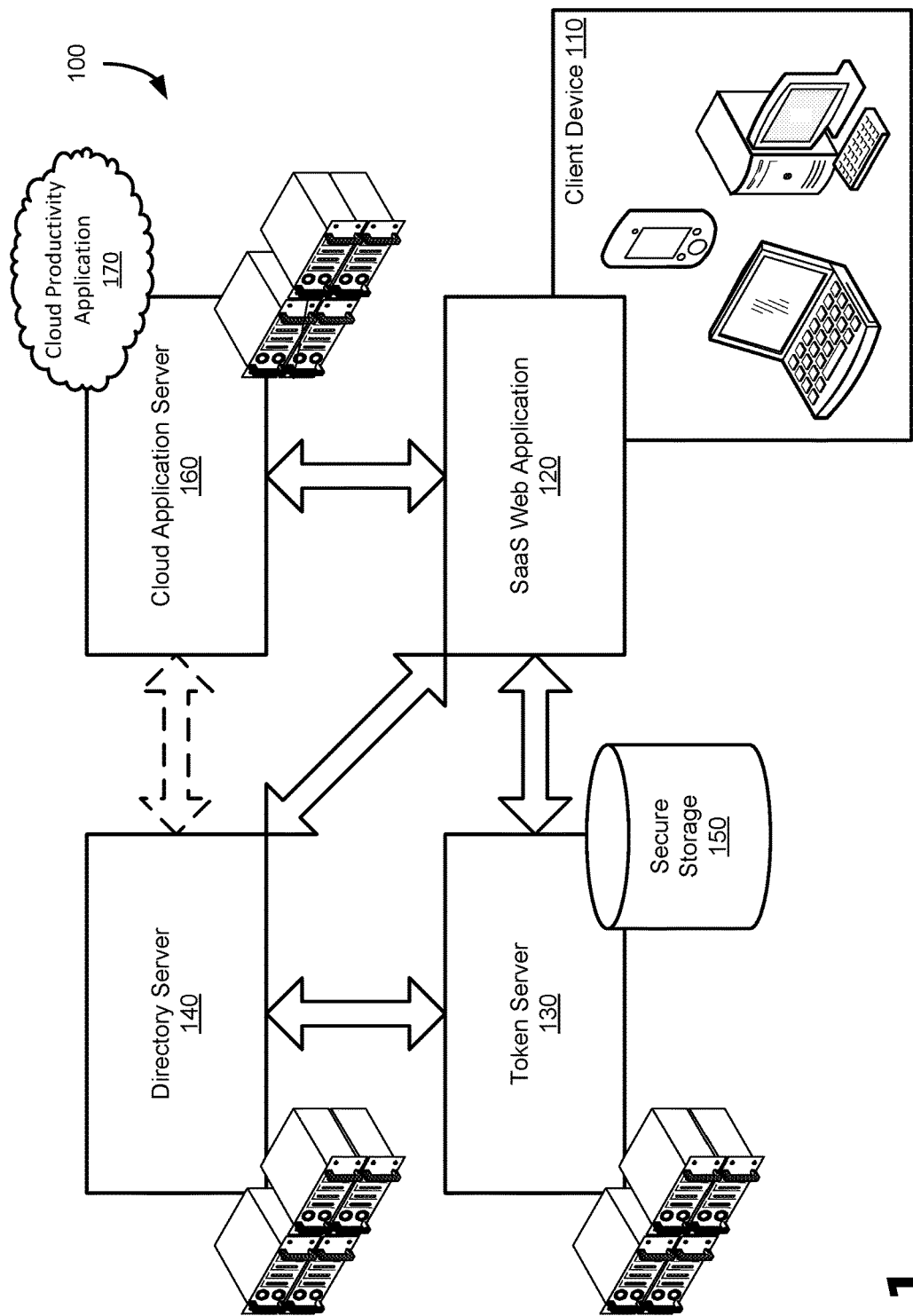

The following detailed description refers to the accompanying drawings. Wherever possible, the same reference numbers are used in the drawings and the following description refers to the same or similar elements. While examples may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description is not limiting, but instead, the proper scope is defined by the appended claims. Examples may take the form of a hardware implementation, or an entirely software implementation, or an implementation combining software and hardware aspects. The following detailed description is, therefore, not to be taken in a limiting sense.

Systems, methods, and computer readable media are provided herein to enable a Single Sign On (SSO) experience when working across different platforms. A user may work across different platform when using multiple devices, when using multiple browsers on a single device, or when an integrated application requires a separate Sign On to be accessed within a host web application or portal service.

When a user first makes use of the present disclosure for a given cloud productivity application, user credentials to access the given cloud productivity application are provided to an Identity Provider. The token service of the Identity Provider will handle the user's authorization with the cloud productivity application's service provider and will store the user's refresh token and the access token received from the service provider in association with other login credentials and access for the user.

When a user subsequently makes use of the present disclosure and has been authorized to access a first service, the stored access tokens and refresh tokens are used to automatically sign the user into other services as they are requested. For example, after a user has logged into a first social media website, productivity application, or other account, the user will be provided with the access tokens to access a second social media website, productivity application or other account without having to manually input user credentials again.

The present disclosure improves the efficiency of the computing devices employing it by reducing the amount of user input required to maintain connectivity to multiple cloud productivity application and provide an SSO therefor. The user experience is also improved, as users do not need to supply authentication credentials as frequently and may freely choose to use multiple platforms instead of limiting their use to a single platform.

FIG. 1 is a block diagram of an example environment 100 for providing cross-platform single sign-on (CP-SSO) when accessing productivity services that are integrated within a Software as a Service (SaaS) platform that acts as an Identity Provider (IdP). As illustrated, a SaaS web application 120 that integrates productivity application functionality is run on a client device 110 and is in selective communication with a token server 130 managing access to a secure storage 150, a directory server 140, and a cloud application server 160 operable to provide the productivity service. The directory server 140 is in turn in selective communication with the token server 130 and (optionally) the cloud application server 160. As will be appreciated, although the example environment 100 shows one of each element, in various aspects multiple of each element may be provided.

Each of the client device 110, token server 130, directory server 140, and cloud application server 160 are illustrative of a multitude of computing systems including, without limitation, desktop computer systems, wired and wireless computing systems, mobile computing systems (e.g., mobile telephones, netbooks, tablet or slate type computers, notebook computers, and laptop computers), hand-held devices, multiprocessor systems, microprocessor-based or programmable consumer electronics, minicomputers, printers, and mainframe computers. The hardware of these computing systems is discussed in greater detail in regard to FIGS. 5, 6A, 6B, and 7. Client devices 110 are operated by users, who may be humans or automated systems (e.g., "bots"). In various aspects, the client device 110, token server 130, directory server 140, and cloud application server 160 may be accessed by a user or each other locally and/or by a network, which may include the Internet, a Local Area Network (LAN), a private distributed network for an entity (e.g., a company, a university, a government agency), a wireless ad hoc network, a Virtual Private Network (VPN) or other direct data link (e.g., Bluetooth connection, a direct wired link).

The SaaS web application 120 runs on the client device 110 to provide a user with a service from one or more cloud application servers 160. In various aspects, the SaaS web application 120 is an HTML or JavaScript-based application or portal running in an internet browser, but in other aspects may be an executable that is run locally which accesses the SaaS or another browser-based system that exposes hosted code to the client device 110 for executing as SaaS.

The directory server 140 provides authentication services for the user. According to certain aspects, the directory server 140 is an identity provider (IdP) which issues identity tokens, access tokens, and multi-resource refresh tokens, and may include, but is not limited to: Active Directory Federation Services (ADFS), Azure Active Directory, Open Directory, Apache DS, Facebook®, YahooID, GoogleID, OpenID, OpenLDAP, among other IdPs. Depending on the configuration of the directory server 140, the SaaS web application 120 may direct its attempts for authentication for various productivity applications provided as SaaS to the directory server 140 instead of or in addition to the cloud application servers 160 providing those services.

The secure storage 150 in the present example stores for the directory server 140 various keys, tokens, and other shared secrets, as well as the associated identities (usernames, domains, account numbers, etc.) that are used for authentication with the directory server 140 and other services. In various aspects, the secure storage 150 is a database that maintains the access information and associated identities and the state of the access information related to the users' needs (e.g., whether a token has expired).

The token server 130 provides access tokens for identified users. As will be appreciated, an access token is an object that describes the security context of a process or thread, such as the SaaS web application 120, and includes the identity and privileges of the user associated with that process or thread. When a user sends an authentication request, the token server 130 verifies the user's shared secret by comparing it with information stored in a security database. If the shared secret is authenticated, the token server 130 produces an access token by communicating with the directory server 140. The SaaS web application 120 may then share this access token to be authenticated by various other systems so that the SaaS web application 120 can supply the access token to identify the user when a thread or process interacts with another thread, process, or object that requires privileges (e.g., the cloud productivity application 170) without having to resubmit the shared secret for that thread, process, or object.

The cloud application server 160 is a web service that the SaaS web application 120 will interact with to implement additional services for the user. In various aspects, the cloud application server 160 provides a second cloud productivity application 170 or communication application for integration into the SaaS web application 120. For example, where the cloud productivity application 170 is an online word processor (e.g., the Google Docs™ or Word 365™ online word processing applications) the cloud application server

160 may provide an Instant messenger application or a spreadsheet application for integration with the word processor. In other aspects, the cloud application server 160 provides a second cloud productivity application 170 or communication application for integration into a web portal provided by the SaaS web application 120. For example, where the SaaS web application 120 is a social media platform (e.g., Salesforce.com™, LinkedIn®, Facebook®), the cloud application server 160 may provide an email client, a music player linked to a music library or access rights account, or a productivity application (e.g., the Google Docs™ or Office 365™ suite of online productivity applications) that will be integrated into the SaaS web application 120 when accessed by the client device 110.

Figure 2:
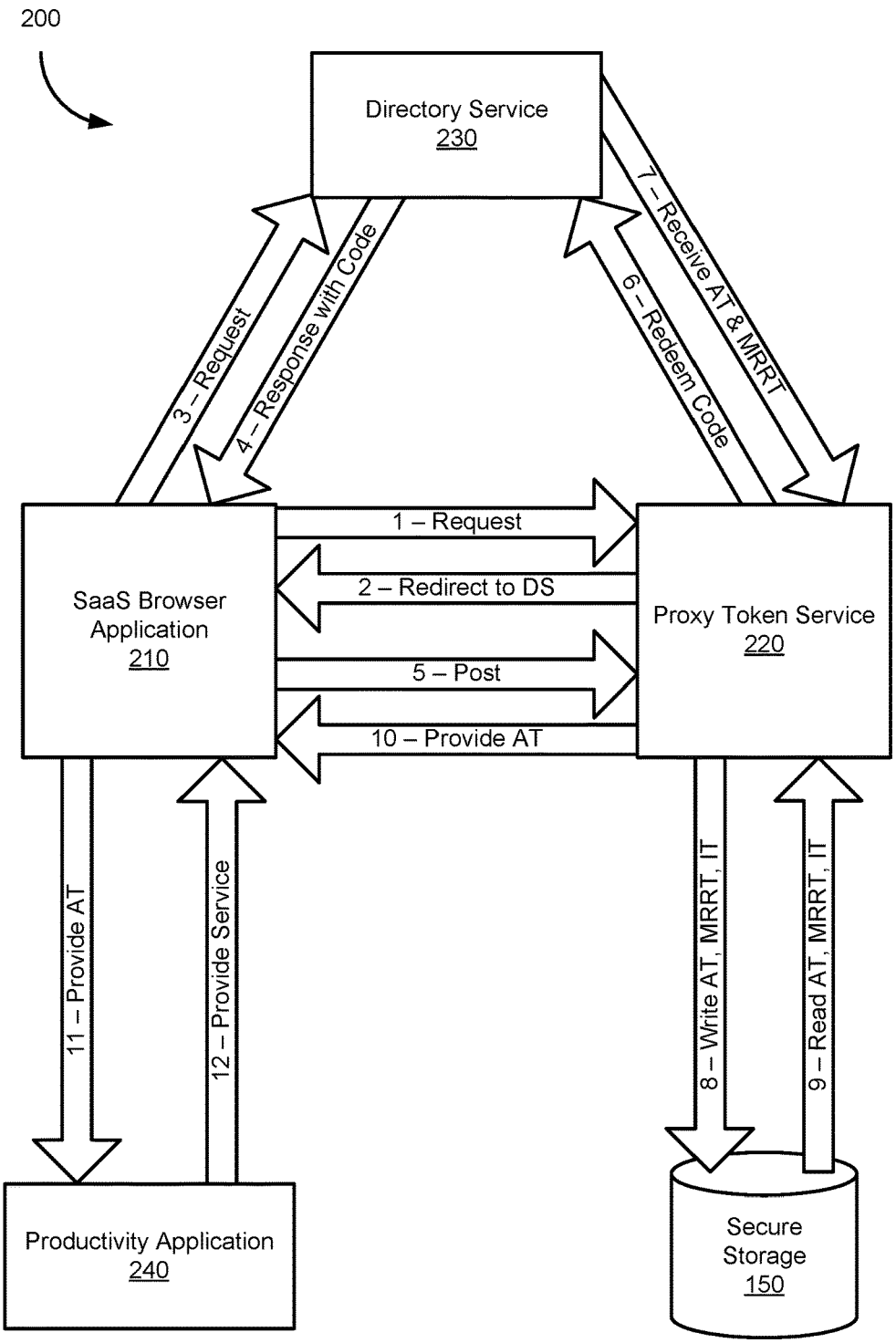
FIG. 2 illustrates an example flow of data in an example cross-platform single sign-on in which the user has not yet been authenticated.

With reference now to FIG. 2, a data flow diagram 200 is provided that illustrates an example flow of data in an example cross-platform single sign-on (CP-SSO) for accessing productivity services that are integrated within a Software as a Service (SaaS) web application 120 for improving the efficiency of the network. More specifically, the data flow diagram illustrates an example flow of data in which the user has not been previously authenticated by the data flow or the one or more productivity services that are integrated within a SaaS web application.

In the illustrated example, the flow of data starts when the user uses a computing device to access a SaaS browser application 210. More specifically, the user enters a URL that is associated with the SaaS browser application 210 into a web browser. It should be noted that a magnitude of web browsers are suitable for employing in the flow of data including, without limitation, Internet Explorer® by Microsoft Corp., Firefox™ by Mozilla, Chrome™ by Google, and Safari® by Apple, etc. Further, upon navigating the web browser to the URL associated with the SaaS web application, the user is typically required to enter a user credential or a user password to sign-in to the SaaS web application 120. Once the user logs into to the SaaS web application, the SaaS web application includes a variety of selectable functionalities.

As illustrated in Step 1 of FIG. 2, the SaaS browser application 210 includes one or more selectable controls for interacting with the various functionalities provided by the SaaS web application 120. According to one aspect, the user may select a displayed banner relating to the productivity application 240. According to another aspect, the user selects an entry point associated with a productivity application 240. According to other aspects, the user chooses to "sign-in" to the productivity application 240. In one example, the SaaS browser application 210 sends a HTTP Request to a proxy token service end point for processing where the proxy token service 220 analyzes the request to determine how to respond. For example, the proxy token service 220 may analyze the request by determining whether an access token and/or a ID token is responsive to the request.

Further, in Step 2 of FIG. 2, the proxy token service 220 returns a response to the HTTP request. It should be recognized that because the user has not been previously authenticated by the data flow, the proxy token service 220 is unable to identify an access token or an ID token that is associated with the user. Accordingly, the proxy token service's 220 response redirects the user to an endpoint to provide authorization. In one example, the proxy token service 220 response is a HTTP Response status code "302 found," which redirects the user. Specifically, an example response includes a URL for redirecting the user to a directory service 230 for authorization and a nonce for security purposes.

As illustrated in Step 3 of FIG. 2, the user's SaaS browser application 210 is redirected to request user authentication from a directory service 230. The directory service 230 prompts the user for account credentials associated with the productivity application 240. For example, the sign-in request includes the client ID for the productivity application 240 and a redirect URL associated with the proxy token service 220. According to one aspect, the user's SaaS browser application 210 is re-directed to a directory service end point, which includes a setting state with the value of nonce identified in Step 2 of FIG. 2 and another nonce value for its own for security. According to another aspect, the user's SaaS browser application 210 is re-directed to a directory service end point including an additional security feature that identifies the proxy token service 220, such as identifying the URL associated with the proxy token service 220. It should also be appreciated that in some aspects the proxy token service 220 is used as an additional security feature when the proxy token service 220 is a registered confidential OAuth2.0 client associated with the directory service 230.

Further, in Step 4 of FIG. 2, the productivity service requests an identity token and an authorization code from the directory service 230. According to one aspect, in response to the SaaS browser application 210 being redirected to the directory service end point, the directory service 230 attempts to establish whether to require entering a user password associated with the productivity application 240 or if the productivity application 240 has SSO configured. If the password is necessary, the directory service 230 receives the password from the user and compares the password with a hash stored in the directory service's identity store.

When the directory service 230 determines that the user account is stored in the directory service's identity store, it returns a JSON object or other notification to the SaaS browser application 210. For example, the directory service may return a 200 OK status code. When the directory service 230 determines that the user and password are authorized, the directory service 230 returns an identity token and an authorization code. According to another aspect, the directory service 230 posts the credentials to the directory service authorization end point. For example, the directory service 230 posts the credentials to "/common" in order to enable use of a multi-resource refresh token (MRRT).

Step 5 of FIG. 2 illustrates that the SaaS browser application 210 communicates the authorization to the proxy token service 220. According to one aspect, the SaaS browser application 210 passes the identity token and the authorization code to the proxy token service 220. According to another aspect, a middleware component (e.g., an OWIN component) intercepts to POST the message.

In Step 6 of FIG. 2, the proxy token service 220 requests the access token and MRRT from the directory service 230. According to one aspect, the proxy token service 220 redeems the authorization code provided to the SaaS browser application 210. According to another aspect, the middleware components redeem the authorization code to retrieve the access token and MRRT. In another example, the middleware component communicates the authorization code to the proxy token service 220 for redeeming the access token and MRRT. It should be appreciated that the later may allow the proxy token service 220 or the directory service 230 to perform load balancing and for backend secure storage. Further, in Step 7 of FIG. 2, the directory service 230 communicates the access token and the MRRT to the proxy token service 220.

As illustrated in Steps 8-10 of FIG. 2, the access token, MRRT, and identity token are stored. According to one aspect, the proxy token service 220 writes the access token, the MRRT, and the identity token in secure storage 150. Further, after the access token, the MRRT, and the identity token are stored in secure storage 150, the proxy token service 220 retrieves the access token based on the mapping of the SaaS browser application 210 to the productivity application 240. Further, the proxy token service 220 communicates the access token to the SaaS browser application 210.

Further, in Step 11 of FIG. 2, the SaaS browser application 210 communicates the access token to the productivity application 240. Specifically, the SaaS browser application 210 uses the access token to instantiate the productivity application 240 via a web SDK (software developer kit). In one example, the SaaS browser application 210 calls a productivity application API with the access token to discover the productivity application's home pool and POSTs the access token to the productivity application 240. The productivity application 240 validates the user's access token and returns requested resources in Step 12 of FIG. 2. Thereafter, the productivity application 240 is provided in the SaaS browser application 210.

Figure 3:
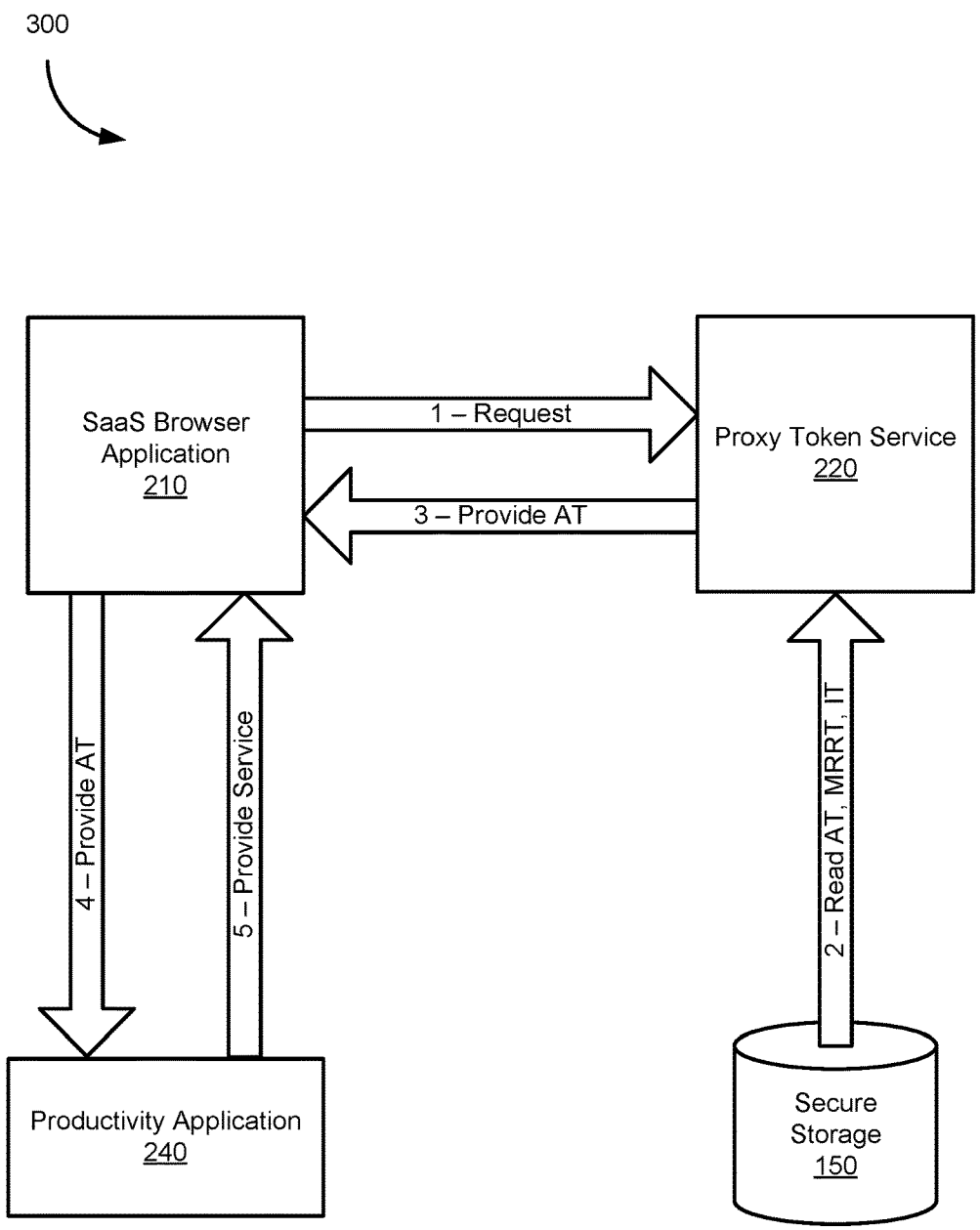
FIG. 3 illustrates an example flow of data in which the user has been previously authenticated.

With reference now to FIG. 3, a data flow diagram 300 is provided that illustrates an example flow of data in an example cross-platform single sign-on (CP-SSO) for accessing productivity services that are integrated within a Software as a Service (SaaS) web application 120 for improving the efficiency of the network. More specifically, the data flow diagram illustrates an example flow of data in which the user has been previously authenticated, within a selected period of time, by the data flow or the one or more productivity services that are integrated within a SaaS web application.

In Step 1 of FIG. 3, the SaaS browser application 210 sends a request to the proxy token service 220 for processing.

As illustrated in Steps 2-3 of FIG. 3, the proxy token service 220 analyzes the request to determine how to respond. In one example, the proxy token service 220 determines whether the access token and/or the identity token are responsive to the request. It should be recognized that because the user has been previously authenticated by the data flow illustrated in FIG. 2, the proxy token service 220 is able to identify an access token, MMRT, and/or identity token that is associated with the user. Thereafter, in Step 3, the proxy token service 220 responds to the request from STEP 1 with the access token.

Steps 4-5 of FIG. 3 illustrate that the SaaS browser application 210 communicates the access token to the productivity application 240 for resource access. In one example, the SaaS browser application 210 uses the access token to instantiate the productivity application 240 via a web SDK. In Step 5, the productivity application 240 returns requested resources or requests a new access token based on the validation result of the access token passed in Step 4. Upon requesting the new access token, the SaaS browser application 210 communications with the proxy token service 220 to acquire the requested access token and then passes it back to the productivity application 240. Thereafter, the productivity application 240 is provided in the SaaS browser application 210.

Figure 4:
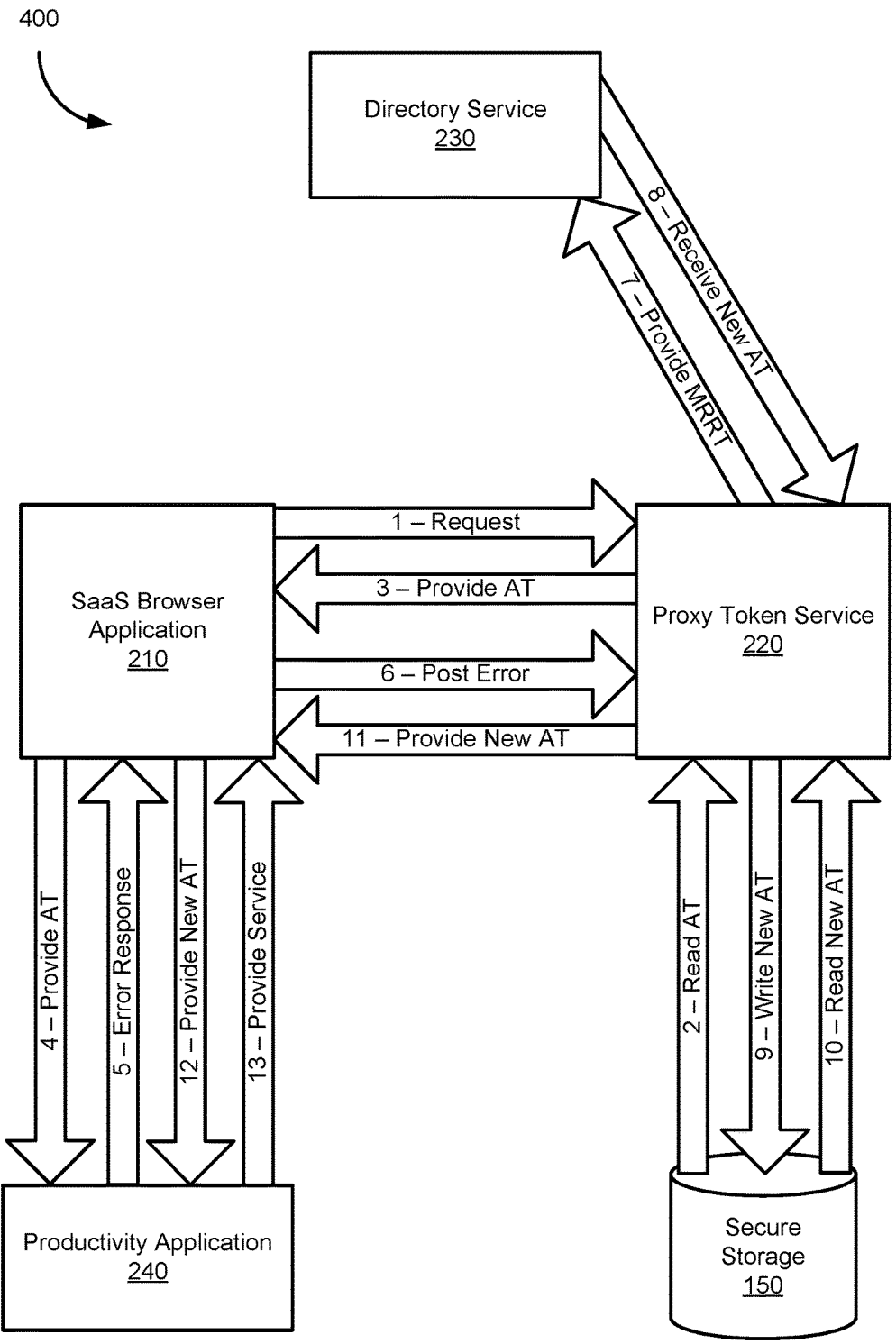
FIG. 4 illustrates an example flow of data in which the user has been previously authenticated, but the access token has expired or been revoked.

With reference now to FIG. 4, a data flow diagram 400 is provided that illustrates an example flow of data in an example cross-platform single sign-on (CP-SSO) for accessing productivity services that are integrated within a Software as a Service (SaaS) web application 120 for improving the efficiency of the network. More specifically, the data flow diagram illustrates an example flow of data in which the user has been previously authenticated, but the access token has expired or been revoked.

The data flow starts at Step 1 of FIG. 4, where the SaaS browser application 210 sends a request to the proxy token service 220 for processing.

As illustrated in Steps 2-3 of FIG. 4, the proxy token service 220 analyzes the request to determine how to respond. In one example, the proxy token service 220 determines whether an access token and/or the identity token a responsive to the request. It should be recognized that because the user has been previously authenticated by the data flow illustrated in FIG. 2, the proxy token service 220 is able to identify an access token, MMRT, and/or identity token that is associated with the user. Thereafter, in Step 3, the proxy token service 220 responds to the request in STEP 1 with the access token.

Steps 4 of FIG. 4 illustrates that the SaaS browser application 210 communicates the access token to the productivity application 240 for authentication. In one example, the SaaS browser application 210 uses the access token to instantiate the productivity application via a web SDK.

In Step 5 of FIG. 4, the productivity application 240 fails to authenticate the account. As mentioned above, in this data flow 400, the access token has expired or has been revoked. More specifically, in one example, the productivity application communicates a 401/403 Response. In response, as illustrated in Step 6 of FIG. 4, the SaaS browser application 210 posts the error response to the proxy token service 220.

As illustrated in Step 7 of FIG. 4, the proxy token service 220 requests a new access token from the directory service 230. According to one aspect, the proxy token service 220 redeems the MRRT. Further, in Step 8 of FIG. 4, the directory service 230 communicates the new access token to the proxy token service 220.

Steps 9-11 of FIG. 4 illustrate that the new access token is stored, retrieved and transmitted to the SaaS browser application 210. According to one aspect, the proxy token service 220 stores the new access token in secure storage 150. Further, the proxy token service 220 retrieves the new access token based on the mapping of the SaaS browser application 210 to the productivity application 240. Further, the proxy token service 220 communicates the new access token to the SaaS browser application 210.

In Steps 12-13 of FIG. 4, the SaaS browser application 210 communicates the new access token to the productivity application 240. When the productivity application 240 authenticates the user's productivity application account, the SaaS browser application 210 is provided with an authentication cookie. Thereafter, the productivity application 240 is provided in the SaaS browser application 210.

While implementations have been described in the general context of program modules that execute in conjunction with an application program that runs on an operating system on a computer, those skilled in the art will recognize that aspects may also be implemented in combination with other program modules. Generally, program modules include routines, programs, components, data structures, and other types of structures that perform particular tasks or implement particular abstract data types.

The aspects and functionalities described herein may operate via a multitude of computing systems including, without limitation, desktop computer systems, wired and wireless computing systems, mobile computing systems (e.g., mobile telephones, netbooks, tablet or slate type computers, notebook computers, and laptop computers), handheld devices, multiprocessor systems, microprocessor-based or programmable consumer electronics, minicomputers, and mainframe computers.

In addition, according to an aspect, the aspects and functionalities described herein operate over distributed systems (e.g., cloud-based computing systems), where application functionality, memory, data storage and retrieval and various processing functions are operated remotely from each other over a distributed computing network, such as the Internet or an intranet. According to an aspect, user interfaces and information of various types are displayed via on-board computing device displays or via remote display units associated with one or more computing devices. For example, user interfaces and information of various types are displayed and interacted with on a wall surface onto which user interfaces and information of various types are projected. Interaction with the multitude of computing systems with which implementations are practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

Figure 5:
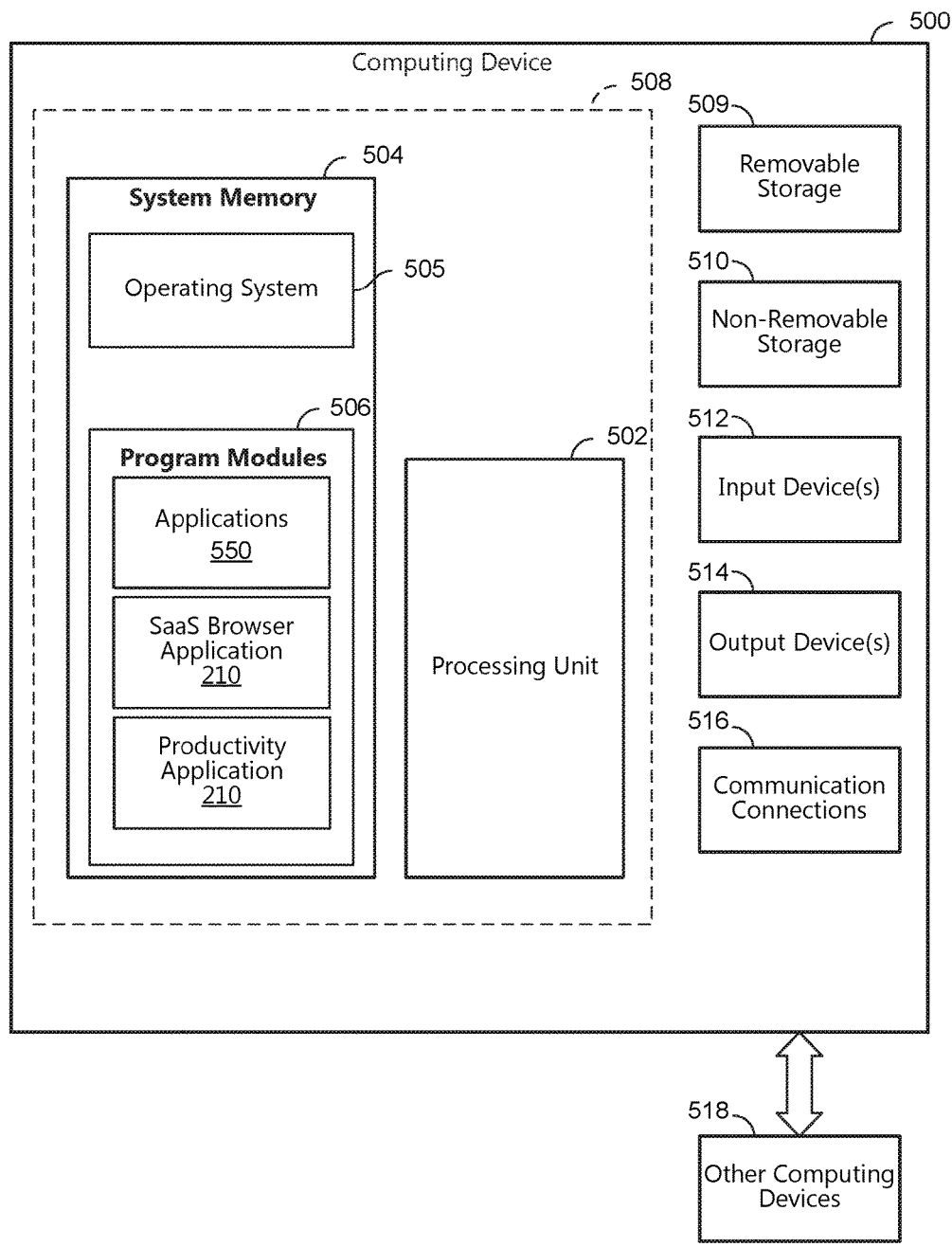
FIG. 5 is a block diagram illustrating example physical components of a computing device.
Figure 6A:
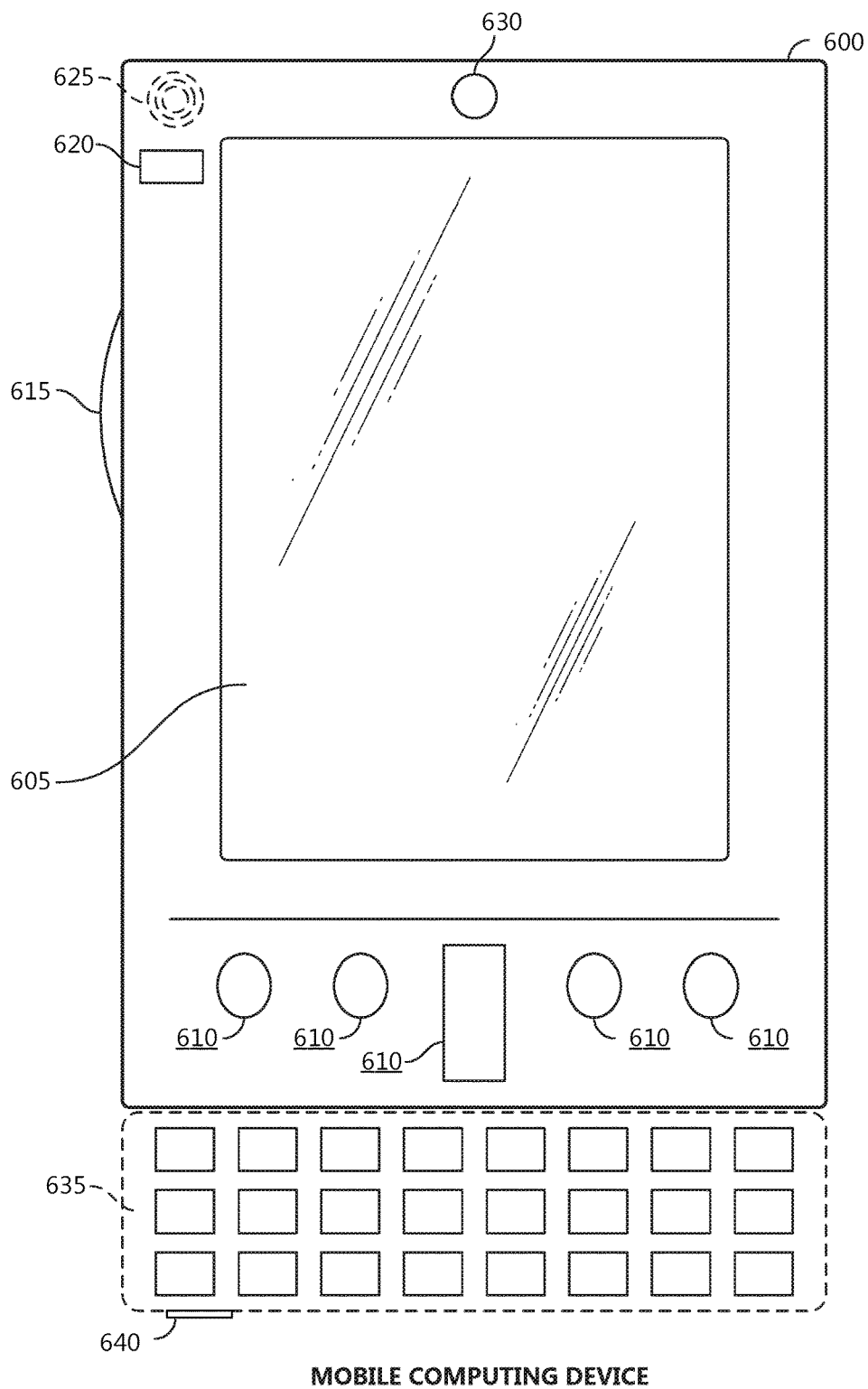
FIGS. 6A and 6B are block diagrams of a mobile computing device.
Figure 6B:
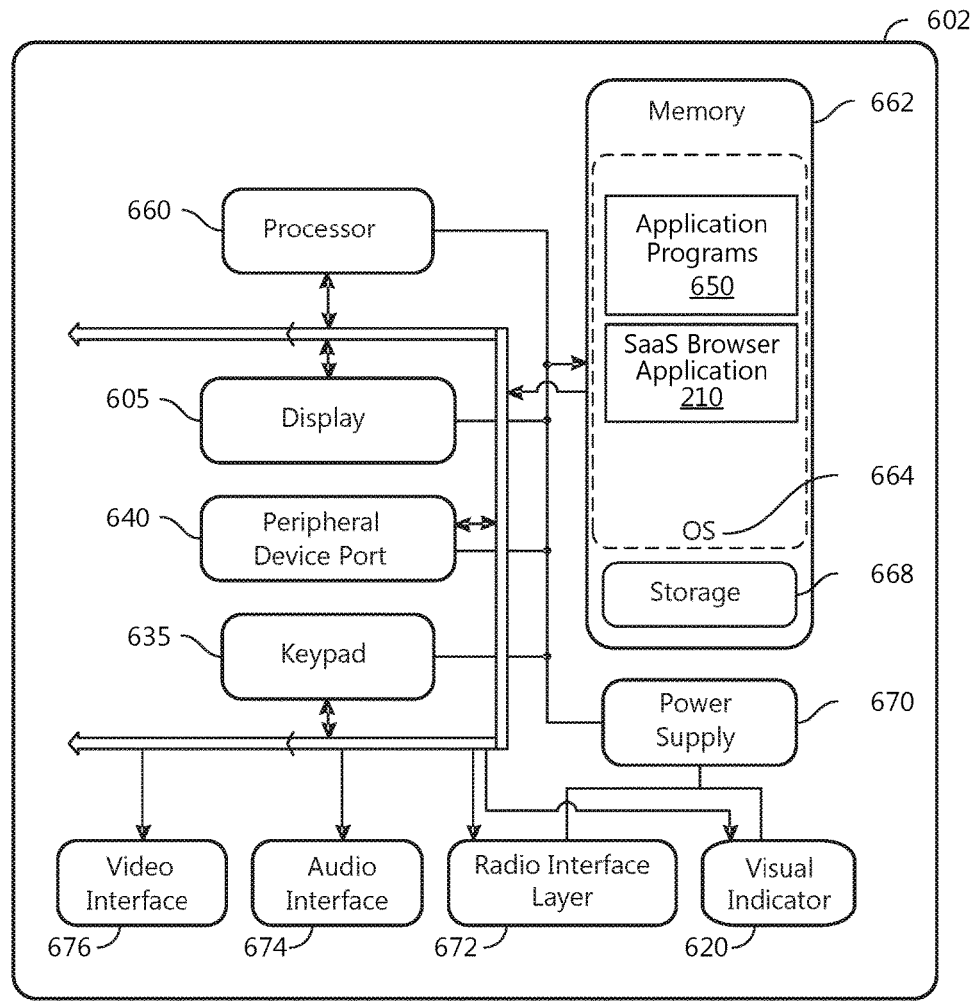
Figure 7:
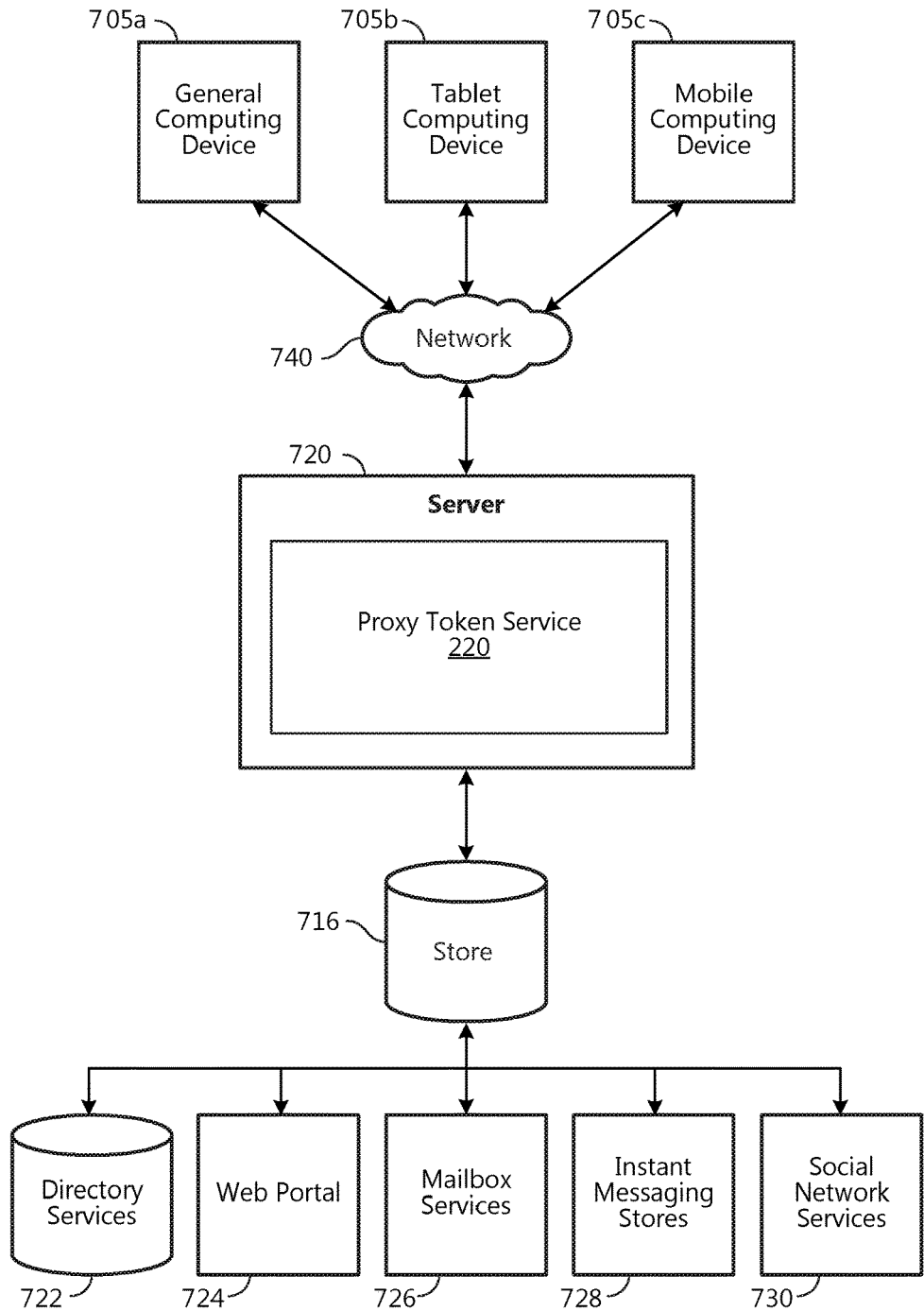
FIG. 7 is a block diagram of a distributed computing system.

FIGS. 5-7 and the associated descriptions provide a discussion of a variety of operating environments in which examples are practiced. However, the devices and systems illustrated and discussed with respect to FIGS. 5-7 are for purposes of example and illustration and are not limiting of a vast number of computing device configurations that are utilized for practicing aspects, described herein.

FIG. 5 is a block diagram illustrating physical components (i.e., hardware) of a computing device 500 with which examples of the present disclosure may be practiced. In a basic configuration, the computing device 500 includes at least one processing unit 502 and a system memory 504. According to an aspect, depending on the configuration and type of computing device, the system memory 504 comprises, but is not limited to, volatile storage (e.g., random access memory), non-volatile storage (e.g., read-only memory), flash memory, or any combination of such memories. According to an aspect, the system memory 504 includes an operating system 505 and one or more program modules 506 suitable for running software applications 550. According to an aspect, the system memory 504 includes the SaaS browser application 210 and/or one or more productivity application 240. The operating system 505, for example, is suitable for controlling the operation of the computing device 500. Furthermore, aspects are practiced in conjunction with a graphics library, other operating systems, or any other application program, and are not limited to any particular application or system. This basic configuration is illustrated in FIG. 5 by those components within a dashed line 508. According to an aspect, the computing device 500 has additional features or functionality. For example, according to an aspect, the computing device 500 includes additional data storage devices (removable and/or non-removable) such as, for example, magnetic disks, optical disks, or tape. Such additional storage is illustrated in FIG. 5 by a removable storage device 509 and a non-removable storage device 510.

As stated above, according to an aspect, a number of program modules and data files are stored in the system memory 504. While executing on the processing unit 502, the program modules 506 (e.g., SaaS browser applications 210) perform processes including, but not limited to, one or more of the stages of the data flows 200, 300, and 400 illustrated in FIGS. 2, 3, and 4. According to an aspect, other program modules are used in accordance with examples and include applications such as electronic mail and contacts applications, word processing applications, spreadsheet applications, database applications, slide presentation applications, drawing or computer-aided application programs, etc.

According to an aspect, the computing device 500 has one or more input device(s) 512 such as a keyboard, a mouse, a pen, a sound input device, a touch input device, etc. The output device(s) 514 such as a display, speakers, a printer, etc. are also included according to an aspect. The aforementioned devices are examples and others may be used. According to an aspect, the computing device 500 includes one or more communication connections 516 allowing communications with other computing devices 518. Examples of suitable communication connections 516 include, but are not limited to, radio frequency (RF) transmitter, receiver, and/or transceiver circuitry; universal serial bus (USB), parallel, and/or serial ports.

The term computer readable media, as used herein, includes computer storage media. Computer storage media include volatile and nonvolatile, removable and non-removable media implemented in any method or technology for storage of information, such as computer readable instructions, data structures, or program modules. The system memory 504, the removable storage device 509, and the non-removable storage device 510 are all computer storage media examples (i.e., memory storage.) According to an aspect, computer storage media include RAM, ROM, electrically erasable programmable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 500. According to an aspect, any such computer storage media is part of the computing device 500. Computer storage media do not include a carrier wave or other propagated data signal.

According to an aspect, communication media are embodied by computer readable instructions, data structures, program modules, or other data in a modulated data signal, such as a carrier wave or other transport mechanism, and include any information delivery media. According to an aspect, the term "modulated data signal" describes a signal that has one or more characteristics set or changed in such a manner as to encode information in the signal. By way of example, and not limitation, communication media include wired media such as a wired network or direct-wired connection, and wireless media such as acoustic, radio frequency (RF), infrared, and other wireless media.

FIGS. 6A and 6B illustrate a mobile computing device 600, for example, a mobile telephone, a smart phone, a tablet personal computer, a laptop computer, and the like, with which aspects may be practiced. With reference to FIG. 6A, an example of a mobile computing device 600 for implementing the aspects is illustrated. In a basic configuration, the mobile computing device 600 is a handheld computer having both input elements and output elements. The mobile computing device 600 typically includes a display 605 and one or more input buttons 610 that allow the user to enter information into the mobile computing device 600. According to an aspect, the display 605 of the mobile computing device 600 functions as an input device (e.g., a touch screen display). If included, an optional side input element 615 allows further user input. According to an aspect, the side input element 615 is a rotary switch, a button, or any other type of manual input element. In alternative examples, mobile computing device 600 incorporates more or fewer input elements. For example, the display 605 may not be a touch screen in some examples. In alternative examples, the mobile computing device 600 is a portable phone system, such as a cellular phone. According to an aspect, the mobile computing device 600 includes an optional keypad 635. According to an aspect, the optional keypad 635 is a physical keypad. According to another aspect, the optional keypad 635 is a "soft" keypad generated on the touch screen display. In various aspects, the output elements include the display 605 for showing a graphical user interface (GUI), a visual indicator 620 (e.g., a light emitting diode), and/or an audio transducer 625 (e.g., a speaker). In some examples, the mobile computing device 600 incorporates a vibration transducer for providing the user with tactile feedback. In yet another example, the mobile computing device 600 incorporates input and/or output ports, such as an audio input (e.g., a microphone jack), an audio output (e.g., a headphone jack), and a video output (e.g., a HDMI port) for sending signals to or receiving signals from an external device. In yet another example, the mobile computing device 600 incorporates peripheral device port 640, such as an audio input (e.g., a microphone jack), an audio output (e.g., a headphone jack), and a video output (e.g., a HDMI port) for sending signals to or receiving signals from an external device.

FIG. 6B is a block diagram illustrating the architecture of one example of a mobile computing device. That is, the mobile computing device 600 incorporates a system (i.e., an architecture) 602 to implement some examples. In one example, the system 602 is implemented as a "smart phone" capable of running one or more applications (e.g., browser, e-mail, calendaring, contact managers, messaging clients, games, and media clients/players). In some examples, the system 602 is integrated as a computing device, such as an integrated personal digital assistant (PDA) and wireless phone.

According to an aspect, one or more application programs 650 are loaded into the memory 662 and run on or in association with the operating system 664. Examples of the application programs include phone dialer programs, e-mail programs, personal information management (PIM) programs, word processing programs, spreadsheet programs, Internet browser programs, messaging programs, and so forth. According to an aspect, SaaS browser application 210 is loaded into memory 662. The system 602 also includes a non-volatile storage area 668 within the memory 662. The non-volatile storage area 668 is used to store persistent information that should not be lost if the system 602 is powered down. The application programs 650 may use and store information in the non-volatile storage area 668, such as e-mail or other messages used by an e-mail application, and the like. A synchronization application (not shown) also resides on the system 602 and is programmed to interact with a corresponding synchronization application resident on a host computer to keep the information stored in the non-volatile storage area 668 synchronized with corresponding information stored at the host computer. As should be appreciated, other applications may be loaded into the memory 662 and run on the mobile computing device 600.

According to an aspect, the system 602 has a power supply 670, which is implemented as one or more batteries. According to an aspect, the power supply 670 further includes an external power source, such as an AC adapter or a powered docking cradle that supplements or recharges the batteries.

According to an aspect, the system 602 includes a radio 672 that performs the function of transmitting and receiving radio frequency communications. The radio 672 facilitates wireless connectivity between the system 602 and the "outside world," via a communications carrier or service provider. Transmissions to and from the radio 672 are conducted under control of the operating system 664. In other words, communications received by the radio 672 may be disseminated to the application programs 650 via the operating system 664, and vice versa.

According to an aspect, the visual indicator 620 is used to provide visual notifications and/or an audio interface 674 is used for producing audible notifications via the audio transducer 625. In the illustrated example, the visual indicator 620 is a light emitting diode (LED) and the audio transducer 625 is a speaker. These devices may be directly coupled to the power supply 670 so that when activated, they remain on for a duration dictated by the notification mechanism even though the processor 660 and other components might shut down for conserving battery power. The LED may be programmed to remain on indefinitely until the user takes action to indicate the powered-on status of the device. The audio interface 674 is used to provide audible signals to and receive audible signals from the user. For example, in addition to being coupled to the audio transducer 625, the audio interface 674 may also be coupled to a microphone to receive audible input, such as to facilitate a telephone conversation. According to an aspect, the system 602 further includes a video interface 676 that enables an operation of an on-board camera 630 to record still images, video stream, and the like.

According to an aspect, a mobile computing device 600 implementing the system 602 has additional features or functionality. For example, the mobile computing device 600 includes additional data storage devices (removable and/or non-removable) such as, magnetic disks, optical disks, or tape. Such additional storage is illustrated in FIG. 6B by the non-volatile storage area 668.

According to an aspect, data/information generated or captured by the mobile computing device 600 and stored via the system 602 are stored locally on the mobile computing device 600, as described above. According to another aspect, the data are stored on any number of storage media that are accessible by the device via the radio 672 or via a wired connection between the mobile computing device 600 and a separate computing device associated with the mobile computing device 600, for example, a server computer in a distributed computing network, such as the Internet. As should be appreciated such data/information are accessible via the mobile computing device 600 via the radio 672 or via a distributed computing network. Similarly, according to an aspect, such data/information are readily transferred between computing devices for storage and use according to well-known data/information transfer and storage means, including electronic mail and collaborative data/information sharing systems.

FIG. 7 illustrates one example of the architecture of a system for providing a cross-platform single sign-on (CP-SSO) experience as described herein. Content developed, interacted with, or edited in association with the proxy token service 220 is enabled to be stored in different communication channels or other storage types. For example, various documents may be stored using a directory service 722, a web portal 724, a mailbox service 726, an instant messaging store 728, or a social networking site 730. The proxy token service 220 is operative to use any of these types of systems or the like for providing a cross-platform single sign-on (CP-SSO) experience, as described herein. According to an aspect, a server 720 provides the proxy token service 220 to clients 705a,b,c. As one example, the server 720 is a web server providing the proxy token service 220 over the web. The server 720 provides the proxy token service 220 over the web to clients 705 through a network 740. By way of example, the client computing device is implemented and embodied in a personal computer 705a, a tablet computing device 705b or a mobile computing device 705c (e.g., a smart phone), or other computing device. Any of these examples of the client computing device are operable to obtain content from the store 716.

Implementations, for example, are described above with reference to block diagrams and/or operational illustrations of methods, systems, and computer program products according to aspects. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more examples provided in this application are not intended to limit or restrict the scope as claimed in any way. The aspects, examples, and details provided in this application are considered sufficient to convey possession and enable others to make and use the best mode. Implementations should not be construed as being limited to any aspect, example, or detail provided in this application. Regardless of whether shown and described in combination or separately, the various features (both structural and methodological) are intended to be selectively included or omitted to produce an example with a particular set of features. Having been provided with the description and illustration of the present application, one skilled in the art may envision variations, modifications, and alternate examples falling within the spirit of the broader aspects of the general inventive concept embodied in this application that do not depart from the broader scope.

We claim:

1. A method for single sign-on accessibility of a web-based application at an application service, comprising:
    requesting, from a proxy token service, access to a first web-based application based on a first access request received from a user via the application service;
    receiving a response from the proxy token service indicating that an identity (ID) token is needed to access the first web-based application and redirecting the request to a directory service, wherein the need for the ID token indicates that the first web-based application has not yet been accessed by the user via the application service and indicates that user account credentials need to be supplied to the directory service;
    based on the response from the proxy token server, requesting, from the directory service, access to the first web-based application, wherein the request includes user account credentials for the first web-based application;
    receiving a response from the directory service including the ID token and an authorization code based upon the directory service determining that the user account credentials are authorized to access the first web-based application;
    posting the ID token and the authorization code to the proxy token service and storing the ID token and the authorization code in storage accessible by the proxy token service;
    receiving an access token from the proxy token service, the proxy token service having previously acquired, and stored in the storage, the access token by redeeming the posted authorization code at the directory service;
    providing the access token to the application service to receive authorization to access the first web-based application; and
    when authorization to access the first web-based application is received, based on the access token being received at the application service, displaying the first web-based application in a user-accessible format.

2. The method of claim 1, wherein the account credentials include a user name and password associated with the first web-based application.

3. The method of claim 1, wherein requesting, from the directory service, access to the first web-based application further comprises providing a security feature that identifies the proxy token service.

4. The method of claim 1, further comprising receiving a subsequent request to access a second web-based application from the user via the application service.

5. The method of claim 4, wherein receiving the subsequent request to access the second web-based application further comprises:
    requesting, from the proxy token service, access to the second web-based application based on a second access request received from the user;
    receiving the access token from the proxy token service based on the proxy token service having determined that an ID token is not required due to the access token already being stored in the storage;
    providing the access token to the application service for receiving authorization to access the second web-based application; and
    when authorization to access the second web-based application is received, based on the access token being received at the application service, displaying the second application in a user-accessible format.

6. The method of claim 4, wherein the access token is assigned an expirable period of time and wherein receiving the subsequent request to access the second web-based application SaaS platform further comprises:
    requesting, from the proxy token service, access to the second web-based application;
    receiving the access token from the proxy token service based on the proxy token service having determined that an ID token is not required due to the access token already being stored in the storage, wherein the access token was previously authorized for an assigned expirable period of time;
    providing the access token to the application service for receiving authorization to access the second web-based application;
    receiving a response from the application service that the access token is invalid due to expiration of the selected period of time;
    notifying the proxy token service that the access token is invalid;

receiving a new access token from the proxy token service, the new access token having been acquired by the proxy token service by redeeming a multi-resource refresh token (MRRT) at the directory service, wherein the MRRT was previously received at the proxy token service when the posted authorization code was redeemed at the directory service;

providing the new access token to the application service for receiving authorization to access the second web-based application; and when authorization to access the second web-based application based on the new access token is received, displaying the second productivity application in a user-accessible format.

7. The method of claim 1, wherein the proxy token service retrieves the access token from the storage.

8. The method of claim 7, wherein the proxy token service retrieves the access token from the storage based on a mapping of a user account associated with the application service to a user account associated with the first web-based application.

9. The method of claim 6, wherein the access token, MRRT, and ID token are stored based on a mapping of a user account associated with the application service to a user account associated with the directory service.

10. The method of claim 1, wherein displaying the first web-based application further comprises using, the access token to instantiate the first web-based application via a web software developer kit (SDK).

11. A system for single sign-on accessibility of a web-based application at an application service, comprising:
a processing unit; and
a memory including instructions stored thereon for providing cross-platform single sign-on accessibility, which when executed by the processing unit, causes the system to:
request, from a proxy token service, access to a web-based application based on an access request received from a user via the application service;
receive a response from the proxy token service indicating that an identity (ID) token is needed to access the web-based application and redirecting the request to a directory service, wherein the need for the ID token indicates that the web-based application has not yet been accessed by the user via the application service and indicates that user account credentials need to be supplied to the directory service;
based on the response from the proxy token server, request, from the directory service, access to the web-based application, wherein the request includes user account credentials for the web-based application;
receive a response from the directory service including the ID token and an authorization code based upon the directory service determining that the user account credentials are authorized to access the web-based application;
post the ID token and the authorization code to the proxy token service and store the ID token and the authorization code in storage accessible by the proxy token service;
receive an access token from the proxy token service, the proxy token service having previously acquired, and stored in the storage, the access token by redeeming the posted authorization code at the directory service; and provide the access token to the application service to receive authorization to access the web-based application; and when authorization to access the web-based application based is received, based on the access token being received at the application service, display the web-based application in a user-accessible format.

12. The system of claim 11, further comprising instructions that cause the system to terminate the display of the web-based application.

13. The system of claim 12, further comprising instructions that cause the system to: receive a subsequent request to access the terminated application via the application service.

14. The system of claim 13, wherein receiving the subsequent request to access the terminated web-based application via the application service further comprises instructions that cause the system to:
request, from the proxy token service, access to the web-based application;
receive the access token from the proxy token service based on the proxy token service having determined that an ID token is not required due to the access token already being stored in the storage;
provide the access token to the application service for receiving authorization to access the web-based application; and
when authorization to access the web-based application is received, based on the access token being received at the application service, display the web-based application in a user-accessible format.

15. The system of claim 13, wherein receiving the subsequent request to access the terminated web-based application via the application service further comprises instructions that cause the system to:
request, from the proxy token service, access to the terminated web-based application;
receive the access token from the proxy token service based on the proxy token service having determined that an ID token is not required due to the access token already being stored in the storage, wherein the access token was previously authorized for a selected period of time;
provide the access token to the application service for receiving authorization to access the web-based application;
receive a response from the application service that the access token is invalid;
notify the proxy token service that the access token is invalid due to expiration of the selected period of time;
receive a new access token from the proxy token service, the new access token having been acquired by the proxy token service by redeeming multi-resource refresh token (MRRT) at the directory service, wherein the MRRT was previously received at the proxy token service when the posted authorization code was redeemed at the directory service;
provide the new access token to the application service for receiving authorization to access the web-based application; and
when authorization to access the web-based application is received at the application service, based on the new access token being received at the application service, display the web-based application in a user-accessible format.

16. The system of claim 11, wherein the proxy token service retrieves the access token from the storage based on a mapping of a user account associated with the application service to a user account associated with the web-based application.

17. A computer-readable memory device including instructions stored thereon for providing single sign-on accessibility of a web-based application at an application service, the instructions comprising:
  requesting, from a proxy token service, access to a first web-based application based on an access request received from a user via the application service;
  receiving a response from the proxy token service indicating that an identity (ID) token is needed to access the first web-based application and redirecting the request to a directory service, wherein the need for the ID token indicates that the first web-based application has not yet been accessed by the user via the application service and indicates that account credentials need to be supplied to the directory service;
  based on the response from the proxy token server, requesting, from the directory service, access to the first web-based application, wherein the request includes user account credentials for the first web-based application;
  receiving a response from the directory service including the ID token and an authorization code based upon the directory service determining that the user account credentials are authorized to access the first web-based application;
  posting the ID token and the authorization code to the proxy token service and storing the ID token and the authorization code in storage accessible by the proxy token service;
  receiving an access token from the proxy token service, the proxy token service having previously acquired, and stored in the storage, the access token by redeeming the posted authorization code at the directory service where the access token is assigned an expirable period of time;
  providing the access token to the application service for receiving authorization to access the first web-based application;
  displaying the first web-based application based on the received authorization;
  terminating the first web-based application and the display of the first web-based application;
  receiving a subsequent request to access the first web-based application from the user via the application service;
  in response to the subsequent request to access the first web-based application, requesting, from the proxy token service, access to the application;
  receiving the access token from the proxy token service based on the proxy token service having determined that an ID token is not required due to the access token already being stored in storage, wherein the access token was previously authorized for the expirable period of time; and
  providing the access token to the application service for receiving authorization to access the first web-based application.

18. The computer-readable memory device of claim 17, further comprising when the access token is determined to be valid by the application service, displaying the first web-based application in a user-accessible format.

19. The computer-readable memory device of claim 17, further comprising when the access token is determined to be invalid by the application service due to expiration of the selected time period:
  notifying the proxy token service that the access token is invalid;
  receiving a new access token from the proxy token service, the new access token having been acquired by redeeming a multi-resource refresh token (MRRT) at the directory service, wherein the MRRT was previously received at the proxy token service when the posted authorization code was redeemed at the directory service;
  providing the new access token to the application service for receiving authorization to access the first web-based application; and
  when authorization to the access the first web-based application is received, based on the new access token being received at the application service, displaying the first web-based application within the SaaS platform.

* * * * *